Figure 1:
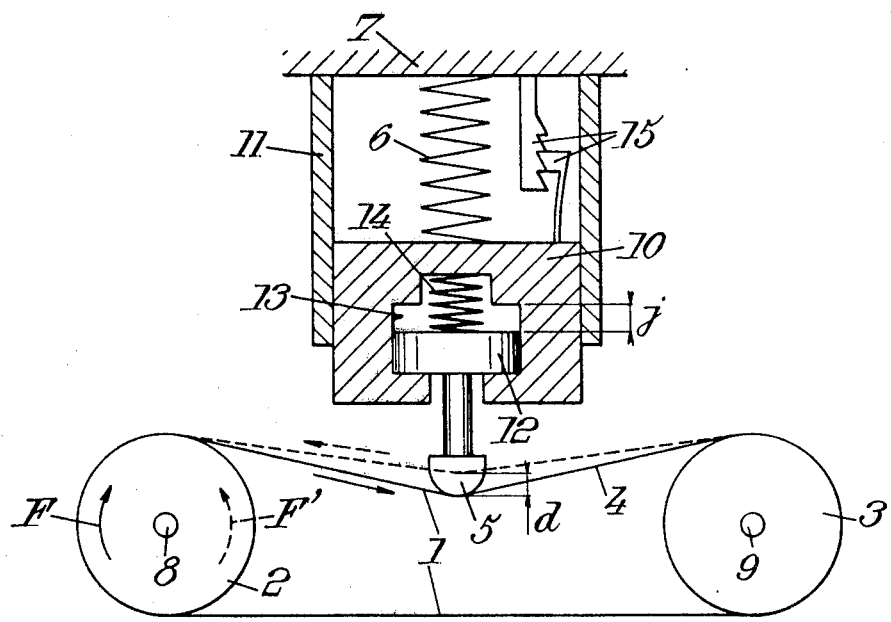

United States Patent [19]

Cadic

[11] 4,040,305
[45] Aug. 9, 1977

[54] DEVICE FOR TENSIONING A CHAIN

[75] Inventor: Raymond Cadic, Cherbourg, France

[73] Assignee: Societe D'Exploitation Des Procedes Felix Amiot S.E.P.F.A., Paris, France

[21] Appl. No.: 704,648

[22] Filed: July 12, 1976

[30] Foreign Application Priority Data

July 18, 1975 France ................................ 75.22580

[51] Int. Cl.² .......................... F16H 7/10; F16H 7/12
[52] U.S. Cl. ...................... 74/242.15 R; 74/242.1 A; 74/242.11 R; 74/242.14 R
[58] Field of Search ................ 74/242.1 A, 242.11 R, 74/242.14 R, 242.15 R

[56] References Cited

U.S. PATENT DOCUMENTS

| 3,647,270 | 3/1972 | Althaus | 74/242.14 R X |
| 3,926,063 | 12/1975 | Mayfield | 74/242.14 R X |
| 3,978,737 | 9/1976 | Bailey | 74/242.14 R X |

Primary Examiner—Leonard H. Gerin
Attorney, Agent, or Firm—Larson, Taylor and Hinds

[57] ABSTRACT

A tensioning device for a run of a chain comprises a toothed roller, for engagement with the chain, rotatably mounted on a crank-pin which is rotated about an axis by resilient means to bring the roller into tensioning contact with the chain. Angular movement of the crank-pin is limited by means carried by the output member of a freewheel. This output member is urged by further resilient means which are weaker than the first mentioned resilient means in the direction to tension the chain.

5 Claims, 4 Drawing Figures

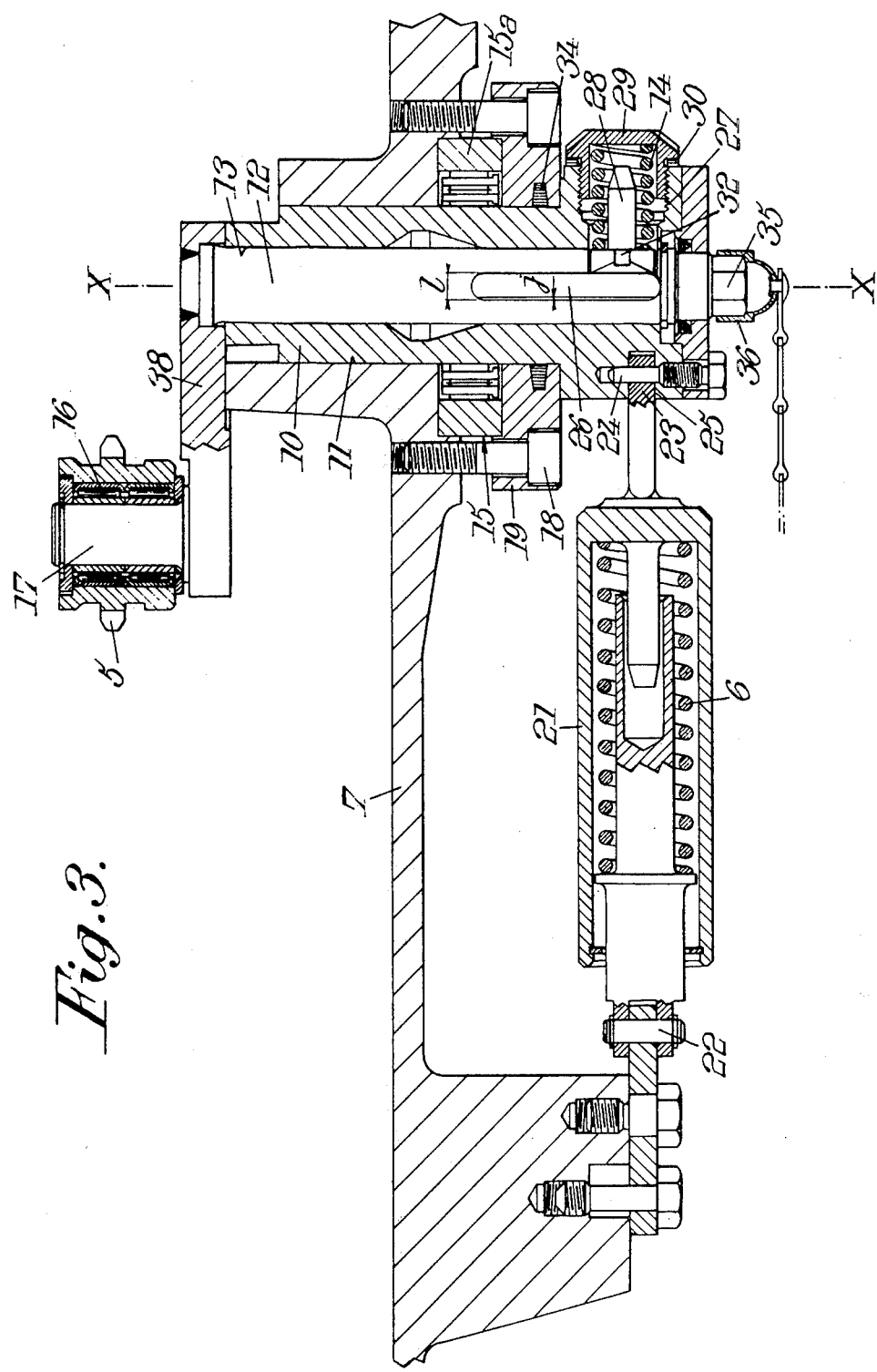

DEVICE FOR TENSIONING A CHAIN

The invention relates to devices for tensioning the chains which serve to transmit torques from a first (driver) sprocket to a second (driven) sprocket having its axis generally parallel to that of the first sprocket, the said chain being engaged with these two sprockets.

It relates more particularly to those, of these chain tensioner devices, which comprises: a tensioning element arranged in such a manner as to bear against the run of the chain to be tensioned, the element being preferably formed by a toothed roller engaged with the said run; and means for supporting and guiding this element relative to the frame which carries the shafts of the two sprockets and for urging it constantly against the run to be tensioned, the said means comprising two structures and two springs, that is to say a first structure directly supported and guided by an element solid with the frame and directly urged by a first spring, and a second structure supporting and guiding the tensioning element, being supported and guided by the first structure and urged in relation to the latter by a second spring in the same direction as that in which the first spring urges the first structure, the amplitude of possible movement of the second structure relative to the first structure being limited by mechanical abutments, and means being provided between the frame and the first structure for preventing relative displacements of the latter relative to the frame in the opposite direction to that corresponding to the application of the tensioning element against the run of the chain to be tensioned.

The invention has for its object, above all, to render the chain tensioning devices of the kind in question such that they are more robust, that is to say permitting chain tensions which are higher than hitherto and presenting a greater working life, while being more economic and lending themselves better than hitherto to reversals of the direction of rotation of the driving pinion, which reversals subject the run of the chain under consideration to be tensioned to change successively from a "slack" state to a "tight" state and back again.

To this end, chain tensioning devices of the kind in question are characterised in that their two structures are pivotally mounted about the same fixed axis connected to the frame.

Such a construction, which may be generically designated "rotary" or "angular" presents over previous constructions of the "rectilinear" type, the important advantage of enabling the means provided between the chassis and the first structure with a view to preventing relative displacements of this first structure relative to this chassis in the direction opposite to that corresponding to the application of the tensioning element against the run of the chain to be tensioned to be formed by a simple free or idle wheel.

In preferred embodiments, use is furthermore made of one and/or the other of the following arrangements:

The first structure comprises a sleeve pivotally mounted in a bearing in the frame, the second structure comprises a cylindrical shaft mounted pivotally in the sleeve, the relative angular movement of the shaft in relation to the sleeve being rendered possible and limited by co-operation of a key fixed to one of these elements with a groove formed in the other element, the groove being of angular width greater than that of the key, and the means for rendering irreversible the pivotal movements of the sleeve relative to the frame are formed by a freewheel, in a chain tensioning device according to the preceding paragraph, the key projects from the cylindrical shaft, in which it is embedded, and the second spring is a helical compression spring bearing against this key.

The invention comprises, in addition to these principal dispositions, certain other dispositions which are preferably used at the same time and which will be discussed more explicitly below.

In the following the invention will be described in more detail with reference to the accompanying drawings in a manner which is of course not limiting.

FIG. 1, of these drawings, shows very schematically a known chain tensioner of the "rectilinear" type, with a view to simplifying the explanations of operation.

Figure 4:
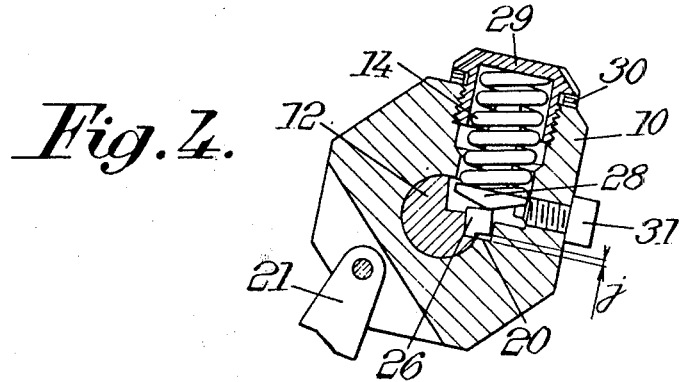
Figure 2:
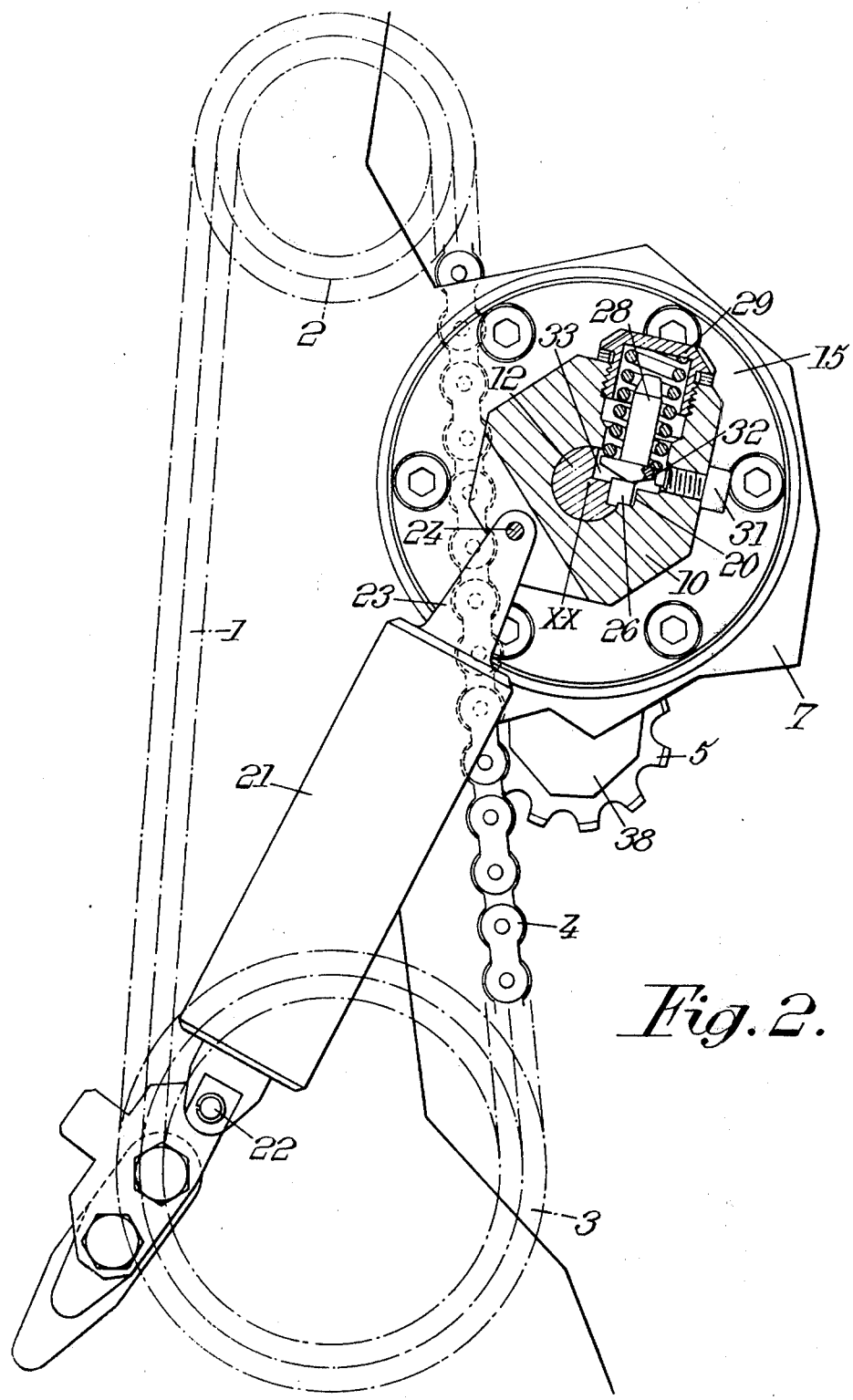

FIGS. 2 and 3 show, respectively in side view and in axial section, a chain tensioner of "angular" type according to the invention, the run concerned by the tension being represented in its "slack" state in FIG. 2 and the chain being omitted in FIG. 3, and FIG. 4 shows in section corresponding to that of FIG. 2 the position occupied by certain elements of the chain tensioner under consideration when the run to be tensioned is in its tensioned state.

It is a question of tensioning an endless chain 1 intended to transmit the driving torque from a first toothed sprocket 2 to a second toothed sprocket 3, the said chain being engaged with these two sprockets.

This tension should be at the same time supple and firm and should permit automatic compensation both of any flight change in the distance between the axes of the two sprockets in relation to the value initially intended for this distance, as well as for wear of the sprocket teeth and the chain links during operation of the transmission.

Furthermore, the tension in question should be ensured over the same run whichever the direction of rotation of the driving sprocket.

It is known that, if the run 4 under consideration is that which extends from the driving pinion 2 to the other (the upper run in FIG. 1 if the pinion 2 turns in the direction of the full arrow F), this run is relatively "slack" while, if it travels in the contrary direction (corresponding to rotation of the sprocket 2 in the sense of the broken arrow F'), this run is under tension.

In the region of the chain tensioner, this difference between the two tensions of the run 4 corresponds to a displacement $d$ of the tensioning element and it is obviously very difficult to apply automatically this element against the run 4 with suppleness and firmness for these displacement $d$ in question.

The tensioning device under consideration comprises:
a tensioning element 5 suitable to bear against the run 4,
a spring 6, constantly urging the element 5 against the run 4,
and a mounting for supporting and guiding the element 5 on the frame 7 which supports the shafts and 8 and 9 of the sprockets 2 and 3.

This mounting is composed of two structures:
a first structure 10, carried and guided by an appropriate element 11 of the frame 7, is directly urged by the spring 6 in the direction tending to apply the element 5 against the run 4.
the second structure 12, which carries the element 5, is itself carried and guided by an appropriate portion 13 of the first structure 10 and it is itself urged in the direction tending to apply the element 5 against the run 4 by a second spring 14 interposed between these two structures and exerting a more powerful force than the spring 6 (even if the difference between the forces exerted by these two springs is small).

Further, a mechanism 15 interposed between the frame 7 and the first structure 10 imposes irreversibility of the displacements of the latter by only permitting them in the direction, indicated above, tending to apply the element 5 against the run 4.

In the diagrammatic arrangement in FIG. 1, corresponding to a known construction of a general "rectilinear" type, the first structure 10 is formed by a piston suitable for sliding in a fixed cylinder 11 solid with the frame 7, — and the second structure 12 is formed by another piston suitable to slide in a cylindrical bore 13 formed in the piston 10.

The relative movements of the piston 12 in its bore 13 are limited to a travel $j$ by limiting abutments. This play $j$ permits element 5 to "withdraw" through the distance $d$, while compressing the spring 14, when the run 4 passes from its slack state to its tensioned state.

The operation of the above tensioner is as follows:

When the chain is stationary or turns in the direction in which the run 4 is slack (arrow F), the element 5 is applied against the run 4 by the action of the relatively light spring 6: the force exerted by the spring 14 being more powerful than that exerted by the spring 6, the assembly of the elements 10 and 12 may, in this phase, be considered as forming a single rigid block, the spring 14 being extended to the maximum and the elememt 12 being in its most "advanced" relative position.

The mechanism 15 then maintains the element 5 in this position defined by the expansion of the spring 6, disposition ensuring correct tension of the chain while it is stationary or turns in the direction indicated, thus both preventing the chain from coming off the sprockets 2 and 3 and preventing the transmission from becoming too tight.

If, starting in the position thus set up, the sense of direction of the driving sprocket 2 is reversed and becomes that of the arrow F', the run 4 becomes the tensioned run and the chain would break or become jammed if no provision was made for slight shortening of this run.

This is the purpose of the spring 14; its compression permits withdrawal of the element 5 up to the end of the permitted course of travel of the element 12 which defines the limit of this withdrawal.

In summary, in the two cases, the tensioner places the element 5 in a limit position of withdrawal.

The limit position of withdrawal corresponding to the "slack" state of the run 4 is determined automatically by the resilient application due to the expansion of the spring 6; this application corrects automatically the geometrical modifications of the transmission insofar as concerns particularly the axial spacing of the sprockets, the particular machining of the teeth of these sprockets, and the wear of the latter and of the links of the chain.

As for the limit position of withdrawal corresponding to the tensioned state of the run 4, it is determined automatically from what is described above by withdrawal of the element 5 corresponding to the play $j$, which is predetermined with precision.

This play and the strength of the spring 14 are chosen in such a manner that the normal working position of the element 5 in the tension state of the run 4 corresponds to maximum compression of the spring 14, that is to say the position in which the element 12 is in its limit withdrawal position which only allows a very slight whipping of the untensioned run of the chain opposite to the run 4.

The known construction of tensioner of the "rectilinear" type which has just been described with reference to FIG. 1 has not given rise to practical embodiments as the result of failure to combine the necessary characteristics of robustness, long life and economy, particularly for high values of the tension of the chain and its speed of displacement, particularly due to difficulties in realizing the non-return mechanism 15.

The "rotary" or "angular" construction according to the invention enables these various disadvantages to be remedied in an elegant manner.

In such a construction, which has been illustrated in FIGS. 2 to 4 the tensioning element 5 is formed by a toothed roller mounted, by means of needle bearing 16 on a crank-pin 17 and the two structures which support and guide this roller 5 are both pivotally mounted about the same axis X—X connected to the frame 7.

The first structure is formed by a sleeve 10 pivotally mounted in a bearing 11 fixed to the frame 7.

This sleeve is surrounded by a cam-type freewheel 15.

This possibility of forming the non-return mechanism by a simple commercially available freewheel, which is particularly robust, durable and inexpensive, constitutes an important advantage of the invention.

The outer cage 15$a$ of this freewheel 15 is fixed to the frame 7, specifically by tightening screws 18 suitable for clamping the said outer cage between the frame and a ring 19 through which, like the bearing 11, the sleeve 10 passes as a close sliding fit.

The internal cylindrical surface of this sleeve is formed with a groove 20 of angular width $l$.

An expansion ram 21 containing a helical compression spring 6, has one of its ends 22 articulated on a point of the frame 7 while its other end in the form of an ear 23 co-operating with a finger 24 traversing a knotch 25 in the sleeve 10.

The position of this finger 24 in relation to the axis X—X and the strength of the spring 6 are determined in such a manner that the torque exerted resiliently by the ram 21 on the sleeve 10 is relatively low.

The second structure is formed by a cylindrical shaft 12 pivotally mounted in a bore 13 formed axially in the sleeve 10.

The crank-pin 17 is mounted eccentrically on this shaft 12 by means of an harm 38 welded at one end of the said shaft.

In this shaft is lodged a key 26 the angular width of which is less than the width $l$ referred to above by an angular play $j$ which renders possible free angular movement of limited amplitude of the shaft 12 in the sleeve 10.

A helical compression spring 14 is located in a screwthreaded hole 27 of the sleeve 10 and is interposed between a pin 28 bearing against the key 26 and a cap-nut 29 screwthreaded into the screwthreaded hole.

The strength of the spring 14 — which is adjustable by the interposition of shim washers 30 between the cap-nut 29 and the edge of the hole 27 — and the distance between the axis of the said spring and the axis X—X are chosen in such a manner that the torque exerted by the said spring on the shaft 12 is greater than that exerted by the ram 21 on the sleeve 10 and in the same direction as the latter.

The chain tensioner on the "angular" type which has just been described differs from that of the tensioner described above with reference to the diagrammatic FIG. 1 in that the displacements of the different moveable members are not rectilinear but are rotary.

FIGS. 2 and 4 concern respectively the tension of a "slack" run of chain (with the spring 14 expanded) and the tension of a "tensioned" run of chain (with the key 26 "withdrawn" in its groove 20 through an angular play which may reach at its maximum the value $j$).

There can also be seen in FIGS. 2 to 4:

a screw 31 appropriate to co-operate with a knotch 32 formed in the pin 28 with a view to preventing rotation of this pin, which is shaped in such a manner as to abut the key 20 in the interior of a cut-out 33 in the shaft 12, a sealing ring 34 for retaining a lubricant provided for the freewheel 15, and a polygonal ferrule fixed to one of the ends of the shaft 12 to permit possible manual adjustment of this shaft, the ferrule being covered by a cap 36 preventing unauthorised operation of this ferrule.

As a result, and whatever the form of embodiment adapted, there is provided a chain tensioner of which the constitution, the operation and the advantages appear sufficiently from the preceding.

Such a tensioner may be applied to tensioning any desirable chain intended for example to transmit torques in motive units for cranes, machine tools or even vehicles.

In a particularly interesting application, but given purely by way of example, such a chain tensioner may be adapted to tension each of two chains used in the device for controlling the angular displacements of the blades of a propeller for a boat, described in French Pat. No. 2,169,456 filed on the Jan. 25, 1972.

As will be self-evident, and as results moreover from the preceding, the invention is no way limited to those of its modes of application and of embodiment which have been more specially envisaged; it includes, on the contrary, all variations.

I claim :

1. Device for tensioning a chain used for transmitting torque from a first toothed sprocket to a second toothed sprocket, comprising a tensioning element adapted to bear in use against the run of chain to be tensioned, means for supporting and guiding this element in relation to the frame which carries the shafts of the two sprockets and for urging it constantly against the run to be tensioned, the said means comprising two structures and two springs, that is a first structure directly supported and guided by an element fixed to the frame and directly urged by a first spring and a second structure supporting and guiding the tensioning element, supported and guided by the first structure and urged in relation to the latter by a second spring in the same direction as that in which the first spring urges the first structure, the amplitude of possible movements of the second structure relative to the first being limited by mechanical abutments, and means being provided between the frame and the first structure for preventing relative displacements of this latter relative to the frame in the opposite direction to that corresponding to the application of the tensioning element against the run of the chain to be tensioned, wherein the two structures are pivotally mounted about the same fixed axis of the frame.

2. A device according to claim 1, wherein the tensioning element is formed by a rotatably mounted toothed roller adapted to engage with the chain.

3. A device according to claim 1, wherein the first structure comprises a sleeve pivotally mounted in a bearing of the frame, the second structure comprises a cylindrical shaft pivotally mounted in the sleeve, angular movement of the shaft relative to the sleeve are permitted and limited by co-operation of a projection on one of the elements with a groove in the other element, the angular width of this groove being greater than that of the projection.

4. A device according to claim 1, wherein the means for preventing movement of the first structure relative to the frame in the said inverse direction comprise a freewheel.

5. A device according to claim 3, wherein the projection is on the shaft and the second spring is a helical compression spring bearing against the projection.

* * * * *